United States Patent
Koyanagi

(10) Patent No.: US 11,470,708 B2
(45) Date of Patent: Oct. 11, 2022

(54) EVENT STAGING SYSTEM AND EVENT STAGING PROGRAM

(71) Applicant: Tom Koyanagi, Tokyo (JP)

(72) Inventor: Tom Koyanagi, Tokyo (JP)

( * ) Notice: Subject to any disclaimer, the term of this patent is extended or adjusted under 35 U.S.C. 154(b) by 238 days.

(21) Appl. No.: 16/664,742

(22) Filed: Oct. 25, 2019

(65) Prior Publication Data

US 2020/0054960 A1  Feb. 20, 2020

Related U.S. Application Data

(63) Continuation-in-part of application No. PCT/JP2018/016885, filed on Apr. 25, 2018.

(30) Foreign Application Priority Data

Apr. 27, 2017  (JP) .............................. JP2017-088066

(51) Int. Cl.
  *H05B 47/00*  (2020.01)
  *H05B 47/165*  (2020.01)
  (Continued)

(52) U.S. Cl.
  CPC .............. *H05B 47/165* (2020.01); *A63J 5/02* (2013.01); *B64C 39/024* (2013.01); *B64D 47/02* (2013.01);
  (Continued)

(58) Field of Classification Search
  CPC ........ H05B 47/165; A63J 5/02; B64C 39/024; B64C 2201/027; B64C 2201/12;
  (Continued)

(56) References Cited

U.S. PATENT DOCUMENTS 7,697,925 B1 * 4/2010 Wilson .................... H04M 1/22
                                                                 455/418
8,909,299 B2 * 12/2014 Mercuri .................. H04M 3/42
                                                                 345/1.3
(Continued)

FOREIGN PATENT DOCUMENTS

DE  102013018918 A1  5/2015
JP  2005-251443 A  9/2005
(Continued)

OTHER PUBLICATIONS

WIPO, Japanese International Search Authority, International Search Report dated Jul. 17, 2018 in International Patent Application No. PCT/JP2018/016885, 3 pages.
(Continued)

*Primary Examiner* — Peter D Nolan
*Assistant Examiner* — Peter Y Ning
(74) *Attorney, Agent, or Firm* — Masuvalley & Partners; Peter R. Martinez

(57) ABSTRACT

[Problem] To implement a variety of realistic staging under various venue environments. [Solution] An event staging system according to the present invention comprises a first device attached to a first moving body and a second device attached to a second moving body. The first device comprises a control means which generates a control command including operation control information for controlling the operation of the device, and a communication means which outputs radio waves of a predetermined intensity and wirelessly transmits the control command within a distance range reachable by the radio waves of the predetermined intensity. The second device includes a communication means which wirelessly receives the control command and an operation execution means which executes operation according to the operation control information included in the wirelessly received control command.

8 Claims, 11 Drawing Sheets

(51) Int. Cl.
*A63J 5/02* (2006.01)
*B64C 39/02* (2006.01)
*B64D 47/02* (2006.01)
*G05D 1/00* (2006.01)
*G05D 1/10* (2006.01)

(52) U.S. Cl.
CPC .......... *G05D 1/0027* (2013.01); *G05D 1/0094* (2013.01); *G05D 1/104* (2013.01); *B64C 2201/027* (2013.01); *B64C 2201/12* (2013.01); *B64C 2201/146* (2013.01)

(58) Field of Classification Search
CPC .............. B64C 2201/146; B64D 47/02; G05D 1/0027; G05D 1/0094; G05D 1/104; A63H 27/12; G06F 3/1431
See application file for complete search history.

(56) References Cited

U.S. PATENT DOCUMENTS

| | | | | |
|---|---|---|---|---|
| 9,148,510 | B2* | 9/2015 | Walsh | H04L 67/52 |
| 9,763,311 | B2* | 9/2017 | Huang | H05B 45/20 |
| 9,955,556 | B2* | 4/2018 | Niu | H05B 47/19 |
| 10,880,975 | B2* | 12/2020 | Song | F21K 2/00 |
| 2012/0044710 | A1* | 2/2012 | Jones | B64C 39/024 362/470 |
| 2013/0314502 | A1 | 11/2013 | Urbach et al. | |
| 2015/0012308 | A1* | 1/2015 | Snyder | H05B 47/155 705/5 |
| 2016/0193539 | A1* | 7/2016 | Homburg | H05B 47/175 700/282 |
| 2017/0090848 | A1* | 3/2017 | Tomita | H05B 47/105 |

FOREIGN PATENT DOCUMENTS

| | | |
|---|---|---|
| JP | 2011-130979 A | 7/2011 |
| JP | 2015-002958 A | 1/2015 |
| JP | 2015-011981 A | 1/2015 |
| JP | 2015-170412 A | 9/2015 |
| JP | 2016-126968 A | 7/2016 |
| WO | WO 2011077740 A1 | 6/2011 |
| WO | WO2016/194333 A1 | 12/2016 |

OTHER PUBLICATIONS

Japan Patent Office, Japanese Office Action (with English translation) dated May 14, 2021 in Japanese Application No. 2017-088066, 9 pages.

EPA, Supplementary European Search Report dated Feb. 19, 2021 in European Application No. EP18790999, 20 pages.

* cited by examiner areas where the screen light emission of each smapho is generated areas where the screen light emission of each smapho is generated no area where the screen light emission of each smapho is generated

EVENT STAGING SYSTEM AND EVENT STAGING PROGRAM

RELATED APPLICATIONS

This application is a continuation-in-part of and claims priority to International Patent Application No. PCT/JP2018/016885, International Filing Date Apr. 25, 2018, entitled Event Staging System And Event Staging Program, which claims benefit of and priority to Japanese Patent Application No. JP20170088066 filed Apr. 27, 2017 entitled Event Staging System And Event Staging Program, both of which are hereby incorporated herein by reference in their entireties.

TECHNICAL FIELD

The present invention relates to an event staging system and an event staging program.

BACKGROUND ART

Conventionally, in an event venue such as a concert, a live performance, a stage performance, etc., the lighting state of a light emitting device such as a penlight held by each of audiences is turned on and off while changing the light emitting to various colors according to the event staging and timing.

Furthermore, with the development of the wireless communication technology in recent years, a control signal can be transmitted from a control device to each light emitting device to emit light by assigning address information corresponding to each seat position of the venue to the light emitting device of each of audiences. In such a case, a predetermined pattern or a color pattern can be expressed as an aggregate of the light emitting devices of the audiences throughout the venue (for example, Patent Documents 1 to 3).

PRIOR ART DOCUMENTS

Patent Documents

Patent Document 1: JP 2016-126968 A
Patent Document 2: JP 2015-11981 A
Patent Document 3: JP 2015-170412 A

SUMMARY OF THE INVENTION

Problems to be Solved by the Invention

However, for example, if the audience moves during the event, the light emitting device held by the audience will be misaligned with a coordinate of the seat position. As a result, a controlled staging pattern cannot be created accurately. Further, if there is originally no seat at the venue such as an outdoor festival, it is very difficult to locate the position of each of easily moving audiences. On the other hand, although it is possible to locate the audience position in real time by using various positioning techniques such as GPS even if no seat, errors that cannot be overlooked occur in specifying the coordinates. For this reason, it is still difficult to achieve a well-controlled staging. In addition, there is a problem that facility costs of the venue become large.

Furthermore, these staging creation systems are controlled by special effect backseat players in accordance with a control program set in advance according to prior decisions regarding performance progress on the stage. For this reason, a flexible staging cannot be expected in terms of impossible to control and change the staging at will by intentions of the performers such as artists and dancers who are main players of concerts and events.

The present invention has been made in view of the above points. In one aspect, the object is to realize a variety of realistic staging under various venue environments.

Means for Solving the Problem

In order to solve the above problems, an event staging system according to the present invention includes a first device attached to a first moving body and a second device attached to a second moving body,
in which the first device has
control means for generating a control command including operation control information for controlling operation of devices, and
communication means for outputting a radio wave of a predetermined intensity and wirelessly transmitting the control command within a distance range where the radio wave of the predetermined intensity can reach, and in which the second device has
communication means for wirelessly receiving the control command, and
operation execution means for executing operation according to the operation control information included in the wirelessly received control command.

The Effect of Invention

According to the embodiments of the present invention, it is possible to realize a variety of realistic staging under various venue environments.

EMBODIMENTS FOR CARRYING OUT THE INVENTION

The embodiments of the present invention will be described in detail with reference to the drawings.

System Configuration

Figure 1:
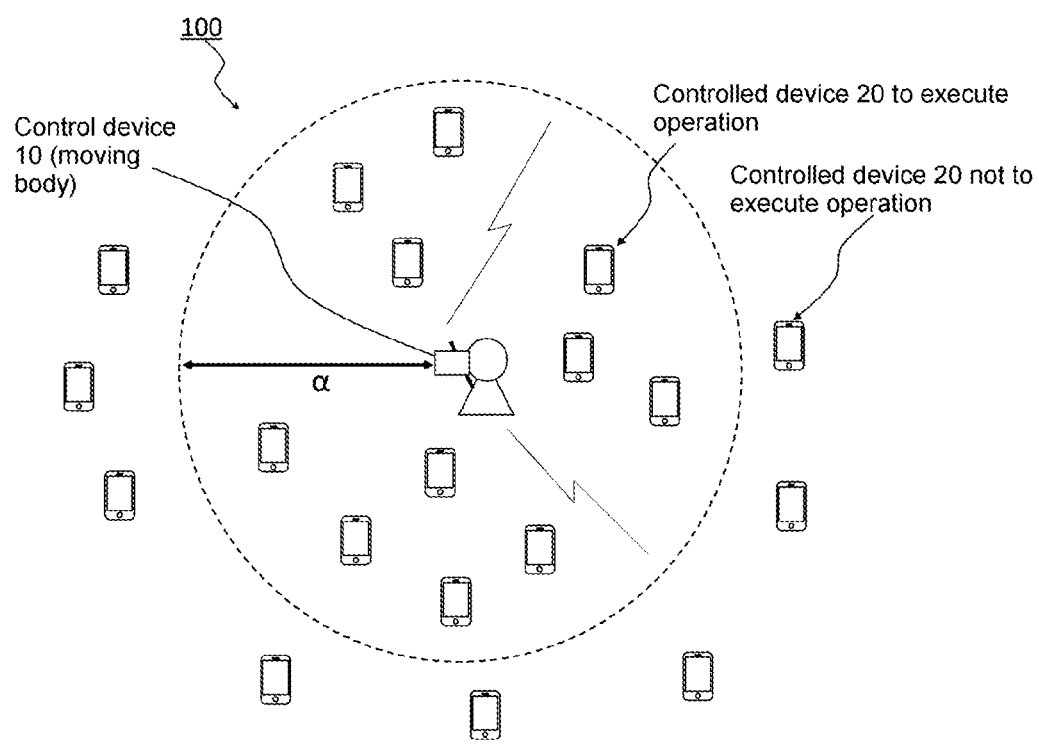
FIG. 1 is a diagram showing a configuration example of the event staging system according to the present embodiment.

FIG. 1 is a diagram showing a configuration example of the event staging system according to the present embodiment. An event staging system 100 in FIG. 1 includes a control device 10 and controlled devices 20.

The control device 10 is a small control device that controls the controlled devices 20. The control device 10 is attached to a moving body that moves in a concert venue. Examples of the moving body include a person such as an artist or a dancer on a concert stage 50, a flying object such as a drone or a hot-air balloon flying in the air, a balloon thrown into audience seats, a camera that moves on a predetermined rail to shoot a concert pattern. In addition, the control device 10 attached to a person has a shape so as to be easily worn on a part of the body such as a bracelet or watch like shape or a belt buckle shape.

Each of the controlled devices 20 is a mobile device that each of the audiences owns, such as a smartphone (hereinafter referred to as "smapho"). The audience does not necessarily have to hold the controlled device 20 by hand, and can hang it on the neck or the like using a predetermined strap or the like. Further, a predetermined application program (referred to as "program for controlled device") is installed in the controlled device 20 in advance. When there are fixed seats in a concert venue, the audiences may seat therein, but sometimes move arbitrarily. Further when there is no fixed seat, the audiences may seat in the arbitrary space. For these reasons, the controlled device 20 is also attached to a moving body as each audience.

Here, a radio wave having a predetermined intensity has been outputted from the control device 10. When the distance between the control device 10 and the controlled device 20 is equal to or less than a predetermined distance a, the controlled device 20 receives, via the wireless radio wave, a control command based on the radio wave that has reached from the control device 10. Note that a is, for example, 5 m. That is, only the controlled device 20 located within the distance range a where the radio wave of the predetermined intensity can reach receives the control command from the control device 10 to execute operation according to the received control command.

The control command includes operation control information and a device ID of a device to be controlled. When the controlled device 20 receives the control command from the control device 10, the controlled device 20 determines whether or not the device ID included in the control command matches a device ID of the own device. When they match each other, the controlled device 20 accepts the control command to execute operation according to the operation control information included in the control command.

The operation control information is information indicating specific operation for controlling operation of the controlled device. For example, when the controlled device 20 is smapho, the operation control includes emitting the smapho screen (or light), changing emission colors, displaying characters on the screen, generating vibrations (vibration) in the smapho and outputting sound from a speaker.

Hardware Configuration

Figure 2:
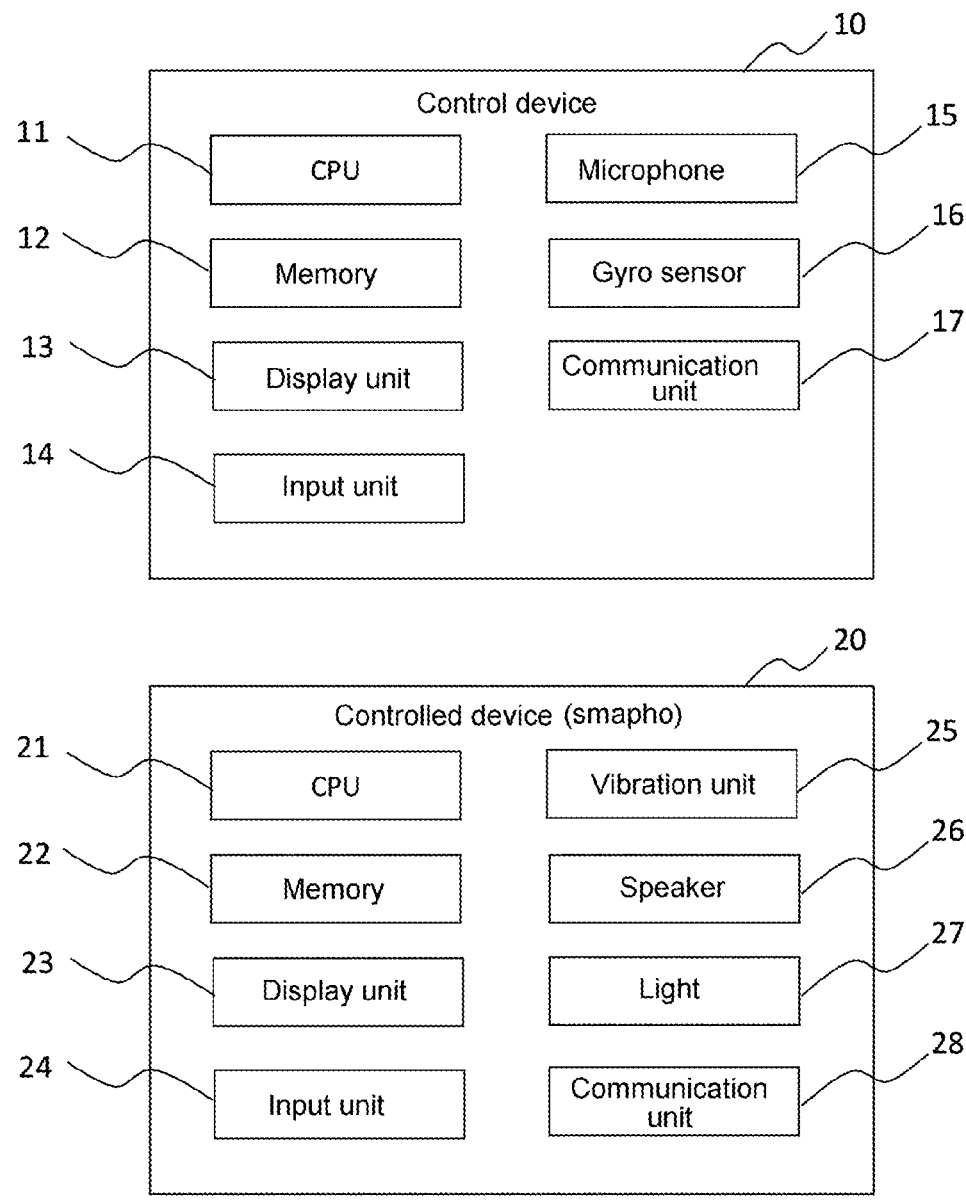
FIG. 2 is a diagram showing a hardware configuration example of a control device and a controlled device according to the present embodiment.

FIG. 2 is a diagram showing a hardware configuration example of a control device and a controlled device according to the present embodiment. As shown in FIG. 2, the control device 10 includes a CPU (Central Processing Unit) 11, a memory 12, a display unit 13, an input unit 14, a microphone 15, a gyro sensor 16 and a communication unit 17.

The CPU 11 executes various programs and performs arithmetic processing. The memory 12 is a storage unit that stores a program for control device and various data.

The display unit 13 is a color display realized by a liquid crystal display, a plasma display, an LED display, or the like. The input unit 14 is realized by a unique operation key, a button, or the like. The input unit 14 may be realized by a touch panel capable of detecting tap coordinates (touch coordinates) on the display screen instead of the operation key and button. In this case, the input operation 14 is realized by a touch panel on the screen, software keys controlled by a program, or the like.

The microphone 15 inputs sound. The gyro sensor (angular velocity sensor) 16 is an inertial sensor that realizes a measurement of a rotational angular velocity. It detects how much an angle of the control device 10 changes per unit time, that is, the speed at which the object is rotating.

The communication unit 17 is a unit for performing wireless communication with the controlled device 20. Here, the communication unit 17 according to the present embodiment uses Bluetooth (registered trademark), which is one of the short-range wireless communication standards. Conventionally, there was a restriction of One-to-one communication according to the standard. However, one-to-many communications (the control device to a plurality of the controlled devices) has recently been supported.

In this regard, when Bluetooth (registered trademark) support devices are used together for the first time, operation of "pairing" is required to specify connection partners. In this embodiment, in order to omit execution of such operation between the control device 10 and the controlled device 20, the control device 10 registers and specifies the controlled devices 20 in advance as the connection partners in the program for control device.

As shown in FIG. 2, the smapho as an example of the controlled device 20 includes a CPU 21, a memory 22, a display unit 23, an input unit 24, a vibration unit 25, a speaker 26 and a communication unit 27.

The CPU 21 executes various programs and performs arithmetic processing. The memory 22 is a storage unit that stores the program for controlled device and various data.

The display unit 23 is a color display realized by a liquid crystal display, a plasma display, an LED display, or the like. The input unit 24 is realized by a unique operation key, a button, or a touch panel capable of detecting tap coordinates on the display screen.

The vibration unit 25 generates vibrations (vibration). The speaker 26 outputs sound. The light 27 is a small illumination provided in the smapho. It generates light like a penlight.

The communication unit 28 is a unit for performing wireless communication with the control device 10. The communication unit 28 according to the present embodiment uses Bluetooth (registered trademark) that is almost standardly installed in recent smapho. Each of the controlled devices 20 registers and specifies the control device 10 as the connection partner in advance in the program for controlled device.

Note that the hardware configuration examples of the control device 10 and the controlled device 20 described above are merely examples. As will be described later, when the controlled device 20 is applied to, for example, a drone other than the smapho, it goes without saying that the hardware configuration is changed depending on the applied device.

Software Configuration

Figure 3:
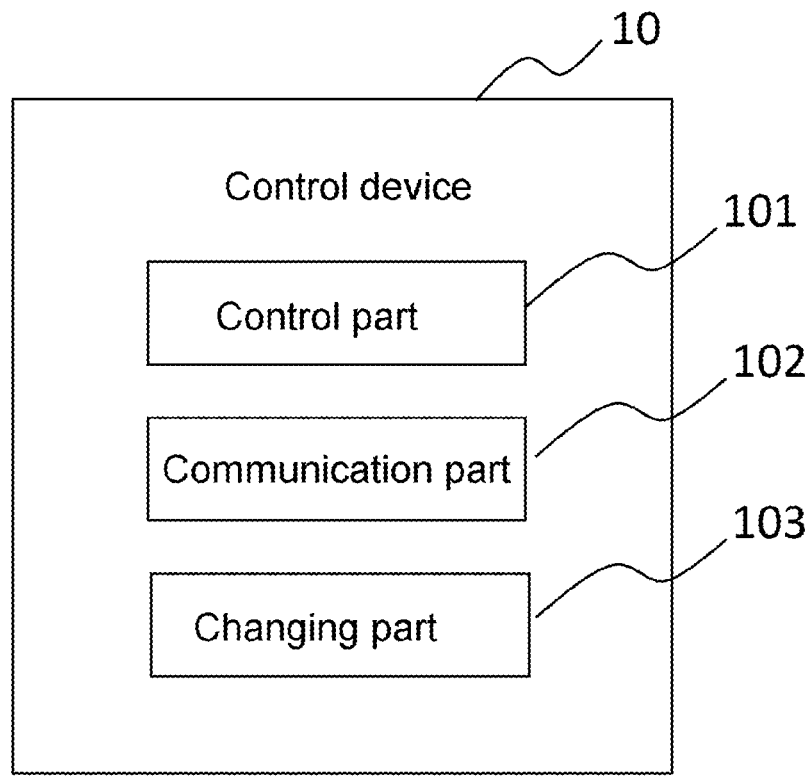
FIG. 3 is a diagram showing a software configuration example of a control device and a controlled device according to the present embodiment.
Figure 3:
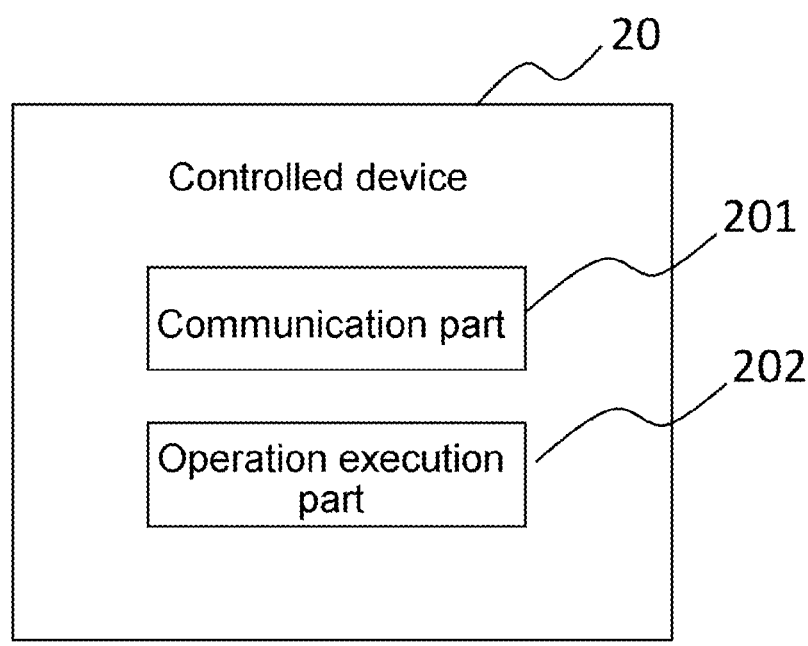

FIG. 3 is a diagram showing a software configuration example of a control device and a controlled device according to the present embodiment.

The control device 10 includes a control part 101, a communication part 102 and a changing part 103 as main functional parts.

The control part 101 has a function of generating a control command including an identifier of the controlled device 20 to be controlled and operation control information for controlling operation of the controlled device 20. In this regard, the controlled device 20 has an identifier (for example, a device ID) of its own device in advance.

The communication part 102 has a function of outputting a radio wave of a predetermined intensity and wirelessly transmitting the control command within a distance range where the radio wave of the predetermined intensity can reach.

The changing part 103 has a function of changing operation of the controlled device 20.

The controlled device 20 includes a communication part 201 and an operation execution part 202 as main functional parts.

The communication part 201 has a function of wirelessly receiving the control command.

The operation execution part 202 has a function to execute operation according to the operation control information included in the wirelessly received control command, when the identifier of the controlled device 20 included in the wirelessly received control command matches the identifier of the own device.

Each functional part is realized by computer programs executed on hardware resources such as CPU, ROM and RAM of computers configuring the control device 10 and the controlled device 20. These functional parts may be read as "means", "module", "unit" or "circuit".

First Example

As the first example, an example (No. 1) in which the present invention is applied to, for example, a concert venue will be described.

Figure 4:
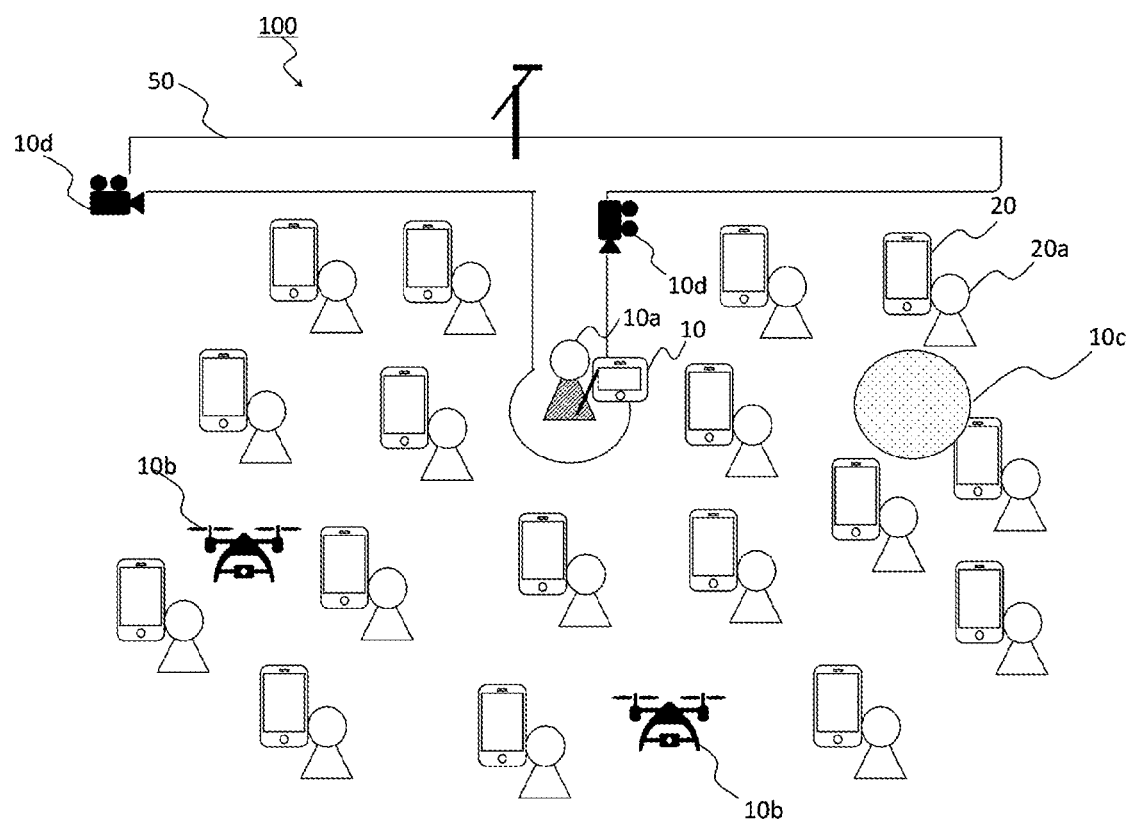
FIG. 4 is a diagram showing a configuration example of the event staging system for a concert venue according to the present example.

FIG. 4 is a diagram showing a configuration example of the event staging system in a concert venue according to the present example. In FIG. 4, each of audiences in the concert venue has smapho 20a as the controlled device 20. Further, in the concert venue the control device 10 is attached to each of "moving bodies": a person 10a such as an artist who moves freely; drones 10b flying over the audiences; a balloon 10c freely moving in the audience seats; and cameras 10d for shooting which moves on predetermined rails. Hereinafter, the explanation will be described per each moving body.

(Control Device 10 Attached to Person 10a)

The person 10a is, for example, an artist or a dancer. The artist and dancer can move freely around the concert venue without restrictions. In addition, they can move in the venue space by being hung from the ceiling or the like by a wire or the like.

Figure 5:
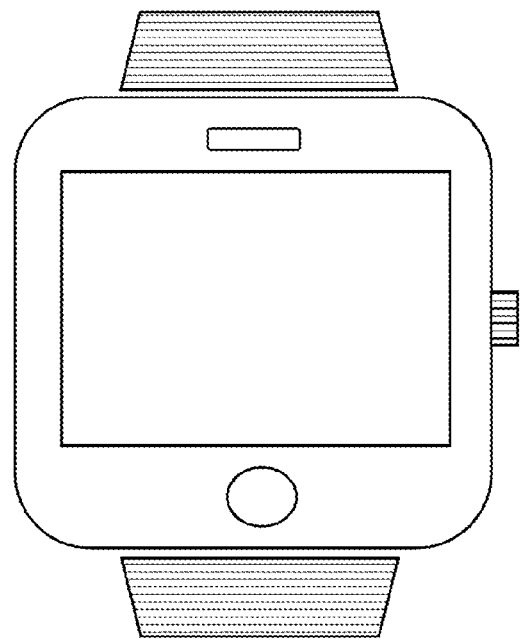
FIG. 5 is a diagram showing an example of a smart watch type control device according to the present example.

FIG. 5 is a diagram showing an example of a smart watch type control device according to the present example. As described above, the control device 10 attached to the person 10a has a shape so as to be easily worn on a part of the body such as a bracelet or watch like shape or a belt buckle shape.

When the control device 10 is attached to the person 10a, the control command from the control device 10 reaches the smapho 20a of each of audiences located within a circle range having a distance radius a (for example, 5 m) centering the person 10a thereon. On the other hand, the control command from the control device 10 does not reach the smapho 20a of each of audiences located outside the circle range having the distance radius a centering the person 10a thereon.

When the smapho 20a receives the control command from the control device 10, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command. In this regard, the device ID of the smapho 20a is set in advance in the program for controlled device.

As described above, when the controlled device 20 is smapho, there is the operation control such as emitting the smapho screen (or light), changing the emission colors, displaying characters on the screen, generating vibration in the smapho, and outputting sound from the speaker.

For example, when the operation control information is screen light emission, in a dim concert venue, for example, the smapho 20a held by each of the audiences emits light centering the person 10a such as an artist or dancer thereon, so that the person 10a is illuminated by surrounding smartphones (the person 10a looks like emitting light). Further, as the person 10a freely moves around the concert venue, the smapho 20a held by the audience emits light so as to follow the moving person 10a, such that it seems for the person 10a to continue to be illuminated by the spotlight.

When the operation control information is vibration, the control device 10 controls the control command to synchronize/resonate the generated vibrations with beats of music in progress. Each vibration sound generated from the vibrations of the smapho 20a centering the person 10a such as an artist thereon and the beats of the music overflowing from the speaker in the venue are synchronized and resonated, thereby to create new staging. As a result, further excitement of the concert is expected.

When the operation control information is sound output, the control device 10 controls the control command to synchronize/resonate the outputted sounds with music sounds in progress. Since the sounds are outputted around the person 10a such as an artist and centering the person 10a thereon, chorus sounds may be outputted for the music sounds of the artist. The music and sounds from the person 10a such as an artist and the sounds outputted from the speaker of the smapho 20a are synchronized and resonated, thereby to create new staging. As a result, further excitement of the concert is expected.

Further, when the operation control information is character/image display, the control device 10 controls the control command to display various characters and images on the screen of the smapho 20a during the concert. The display characters may be lyrics in music, secret messages sent only to audiences located near the artist, or photograph images of the artist or the like.

Note that the control command of the control device 10 can include a plurality of the operation control information at the same time, such as screen light emission and vibration generation.

Furthermore, the person 10a such as an artist can operate/change the control command by using the smart watch type control device 10 (FIG. 5). On the liquid crystal touch panel of the smart watch type control device 10, a "device specifying button" for specifying the controlled device to be controlled and an "operation button" for specifying the operation control are provided. The person 10a can arbitrarily set/change the device ID and the operation control information included in the control command by pressing the buttons.

For example, when the person 10a presses the "device specifying button" for specifying the device ID of the smapho 20a and the "operation button" for specifying vibration in the smart watch type control device 10, the control command including the device ID (Smartphone) and the operation control information (vibration) corresponding to these buttons is transmitted.

Thereby, the person 10a such as an artist can change the staging in various ways such as, with arbitrary intention and timing, causing the smapho screen to emit light or blinking, changing the emission color and vibrating it.

In addition, the above-described button operation can be substituted with a predetermined action by the person 10a wearing the smart watch type control device 10. Examples of the predetermined action include largely swinging arms, turning arms, clapping, taking a predetermined step, and a combination of a plurality of the predetermined actions. Thereby, it is possible to transmit the control command of operation corresponding to such a predetermined action. In this case, the smart watch type control device 10 includes the gyro sensor 16 (FIG. 2) to detect and determine the operation of the predetermined action by the person 10a.

Thereby, the person 10a such as an artist can perform the operating for control command simultaneously with the performance such as largely turning arms. For this reason, it is possible to realize various staging in which for example, the smapho screen emits light, blinks, or the emission color changes so as to match the actions of the artist or dancer.

Also, the button operation described above can be substituted with input of a predetermined sound by the person 10a. Examples of the input of the predetermined sound include "Thank you very much!", "Let's meet again!" or "XXX (part of lyrics)". This makes it possible to transmit the control command of operation corresponding to such a predetermined sound. In this case, the smart watch type control device 10 includes the microphone 15 (FIG. 2) to detect and determine the input of the predetermined sound by the person 10a.

Thereby, the person 10a such as an artist can perform the operating for control command simultaneously with the input of the predetermined sound. For this reason, it is possible to realize various staging in which, for example, the smapho screen emits light, blinks, or the emission color changes so as to match the words, lines, and lyrics spoken by the artist or dancer, furthermore, the next notice of the live will be instantly displayed on the audience's smapho in response to these sounds.

(Control Device 10 Attached to Drone 10b)

Each of the drones 10b flies over the audiences in the concert venue. When the control device 10 is attached to the drone 10b, the control command from the control device 10 reaches the smapho 20a of each of audiences located within a circle range having a distance radius a (for example, 5 m) centering the drone 10b thereon. On the other hand, the control command from the control device 10 does not reach the smapho 20a of each of audiences located outside the circle range having the distance radius a centering the drone 10b thereon.

When the smapho 20a receives the control command from the control device 10, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command.

For example, when the operation control information is screen light emission, in a dim concert venue, the smapho 20a held by each of audiences located around beneath the drone 10b flying and moving in the venue emits light to illuminate the venue seats (a ball of light is seen at the venue seats). Further, as the drone 10b flies and moves freely in the concert venue, the light emission moves at the venue seats, such that it seems to continue to be illuminated by the spotlight.

In addition, in a large concert venue such as an outdoor festival, the drone 10b can fly and move in the air of the concert venue, even in an area where it is difficult for the person 10a to move within the venue or an area where a facility lighting does not reach. For this reason, the operation staging can be generated everywhere in the venue.

Similarly to the above, when the operation control information is vibration, sound output and/or character/image display, the control device 10 can control the control command to respectively generate the operation staging of the smapho 20a. In a case where the operation control information is character/image display, when the drone 10b flying and moving in the venue passes over the audiences, the character/image is displayed on the screen of the smapho 20a held by each of audiences located around beneath the drone 10b. The character/image display includes concert information, today's title, electronic brochures, greetings or messages from an artist, or advertisements. Therefore, the character/image display is distributed to the audiences as if the drone 10b sprays flyers from above.

Note that the drone 10b may be set in advance so as to fly and move on a predetermined air route, or may be operated by a staff member (or an artist).

(Control Device 10 Attached to Balloon 10c)

The balloon 10c is a large balloon that is thrown into the audience seats of the concert venue. When the balloon 10c is thrown into the audience seats, the audiences reach out or repel it, so that the balloon 10c moves in the audience seats unpredictably.

When the control device 10 is attached to the balloon 10c, the control command from the control device 10 reaches the smapho 20a of each of audiences located within a circle range having a distance radius a (for example, 1 m) centering the balloon 10c thereon. On the other hand, the control command from the control device 10 does not reach the smapho 20a of each of audiences located outside the circle range having the distance radius a centering the balloon 10c thereon. In this regard, a is substantially equal to the balloon radius (for example, 1 m).

When the smapho 20a receives the control command from the control device 10, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command.

For example, when the operation control information is screen light emission, in a dim concert venue, the spherical balloon 10c which freely moves within the venue seats caused by the audiences themselves is illuminated by the smapho 20a from below the balloon (looks like it's emitting light). As a result, new staging is created and further concert excitement is expected.

(Control Device 10 Attached to Camera 10d)

Each of the cameras 10d shoots a concert pattern from various positions and angles by moving on predetermined rails installed on the ceiling or wall. The shot video is projected on a large monitor in the concert venue or is made into a DVD video.

When the control device is attached to the camera 10d, the control command is transmitted from the control device to each smapho located within a circle range having a radius a centering the camera 10d thereon. In this regard, a can be set to about 0.5 m or less, for example, to produce a single line of light.

When the control device 10 is attached to the camera 10d, the control command from the control device 10 reaches the smapho 20a of each of audiences located within the circle range having the distance radius a (for example, 0.5 m) centering the camera 10d thereon. On the other hand, the control command from the control device 10 does not reach the smapho 20a of each of audiences located outside the circle range having the distance radius a centering the camera 10d thereon.

When the smapho 20a receives the control command from the control device 10, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command.

For this reason, in a case where the operation control information is screen light emission, in a dim concert venue, when the camera 10d moves on the rail, it appears that a single line of light formed by the emitting of smapho 20a moves on the rail. As a result, new staging is created and further concert excitement is expected. In addition, since the camera 10d moving on the rail is illuminated by the single line of light, it is possible to take a camera-sight-line video that the audience's sight line follows the camera. Usually, since the camera is buried in the darkness of the venue, it is difficult for the audiences to visually recognize its presence, and so it is difficult to shoot the camera-sight-line video.

As described above, according to the present invention, as these moving bodies proceed individually or simultaneously, a plurality of staging (for example, light emission) occurring throughout the concert venue are involved in as a whole, and therefore it is possible to realize the concert staging with high performance and preference.

Second Example

As the second example, an example (No. 2) in which the present invention is applied to, for example, a concert venue will be described. In the present embodiment, a cooperative operation by a plurality of moving bodies will be described in view of the concert venue being large.

Figure 6:
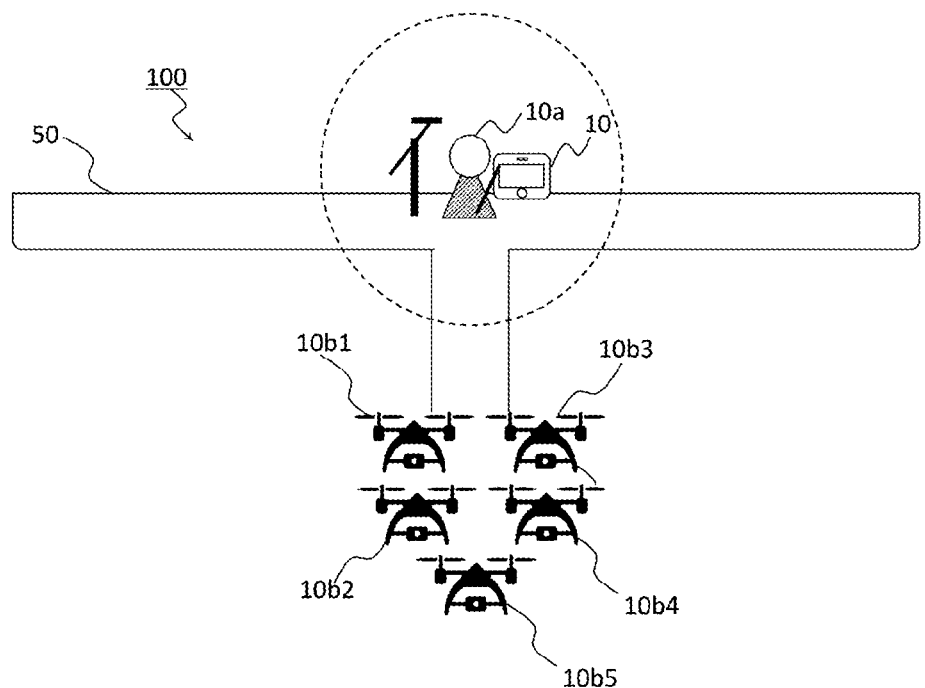
FIG. 6 is a diagram showing a configuration example of the event staging system for a concert venue according to the present example.
Figure 7:
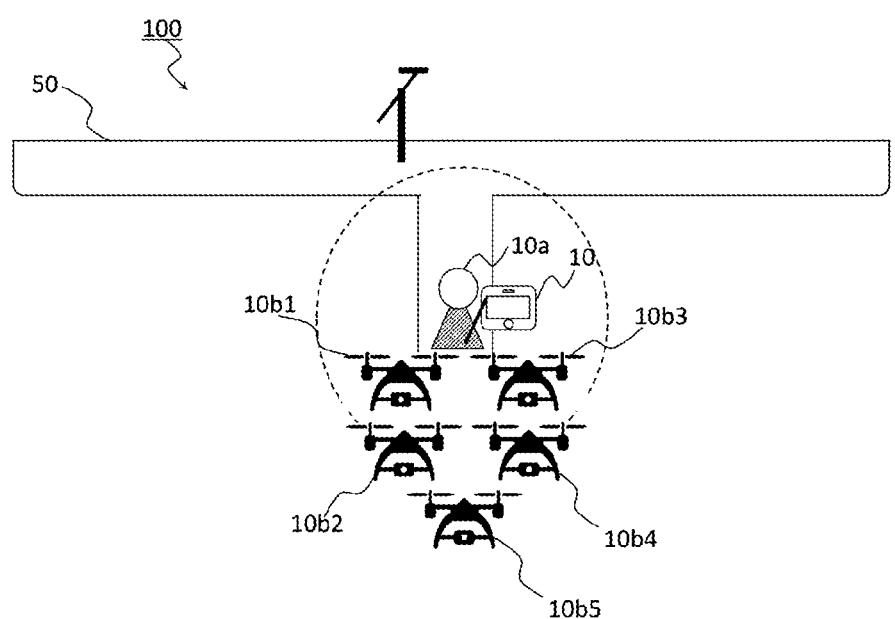
FIG. 7 is a diagram showing a configuration example of the event staging system for a concert venue according to the present example.
Figure 8:
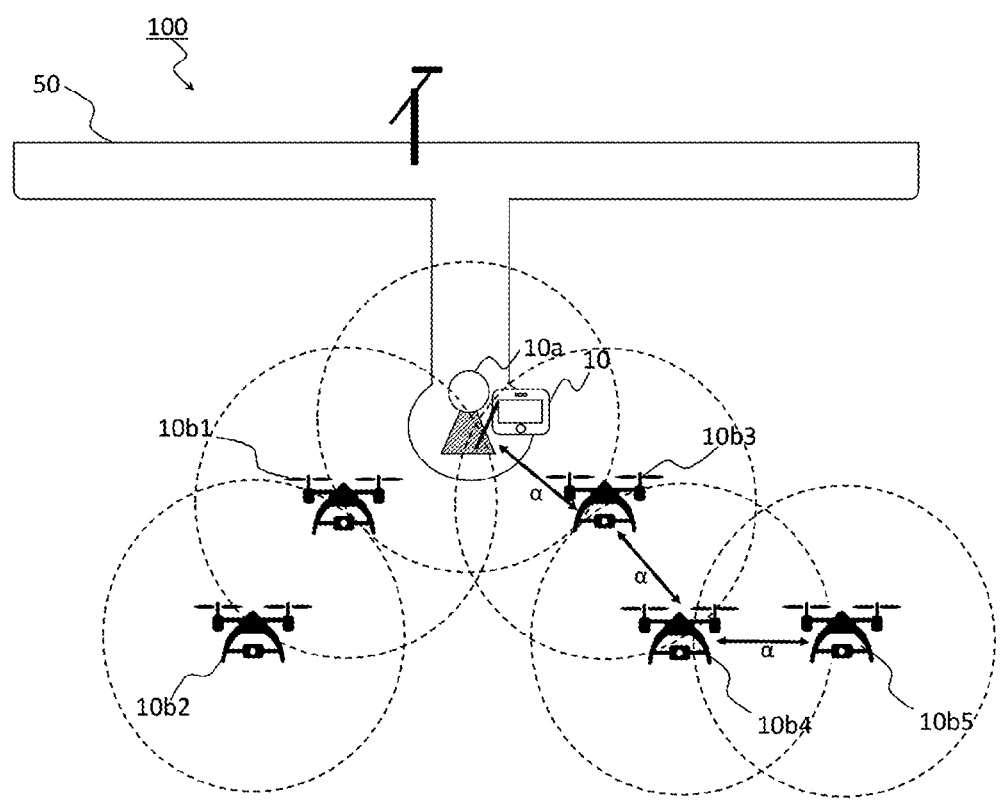
FIG. 8 is a diagram showing a configuration example of the event staging system for a concert venue according to the present example.

Each of FIGS. 6 to 8 is a diagram showing a configuration example of the event staging system in the concert venue according to the present example. In FIGS. 6 to 8, the control devices 10 are respectively attached to, for example, the person 10a such as an artist who freely moves therearound and the drones 10b flying over the audiences as the "moving bodies" in the concert venue.

In FIG. 6, the illustration of the smapho 20a is omitted for the sake of diagram, but each of the audiences in the actual concert venue has the smapho 20a as the controlled device 20. In addition, although five drones of drone 10b1, drone 10b2, drone 10b3, drone 10b4, and drone 10b5 are illustrated, the number of drones can be selected freely depending on the size of the concert venue and the staging.

(Control Device 10 Attached to Person 10a)

The person 10a is, for example, an artist or a dancer. The artist and dancer can move freely around the concert venue without restrictions. Further, as described above, the control device 10 attached to the person 10a has a shape so as to be easily worn on a part of the body such as a bracelet like shape and a watch like shape (FIG. 5).

When the control device 10 is attached to the person 10a, the control command from the control device 10 reaches the smapho 20a of each of audiences located within a circle range having a distance radius a (for example, 5 m) centering the person 10a thereon. When the smapho 20a receives the control command from the control device 10, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command.

Further, in the present example, the drone 10b1, the drone 10b2, the drone 10b3, the drone 10b4 and the drone 10b5, that is, five drones 10b as the controlled devices 20 are respectively landed at predetermined positions on the stage (FIG. 6). When the person 10a approaches the drones 10b, the control command from the control device 10 reaches each of the drones 10b located within the circle range with the distance radius a (for example, 5 m) centering the person 10a thereon (FIG. 7).

When the drone 10b receives the control command from the control device 10, the drone 10b determines whether or not the device ID included in the control command matches the device ID (for example, Drone) of the own device. When they match each other, the drone 10b accepts the control command to execute operation (for example, flying) according to the operation control information included in the control command.

Namely, in a case where the operation control information is flying, when the person 10a approaches the drones 10b that have landed at the predetermined positions on the stage in advance, the five drones 10b start to fly (soar) all at once (FIG. 8).

Here, in order to enable the person 10a to operate the control command for all the drones 10b, all the drones 10b fly and move so as to be positioned within the range a where each other's radio waves reach via the person 10a or another drone 10b. (FIG. 8). Therefore, each drone 10b flies in the air within a distance range of about 5 m from the person 10a or another drone 10b. Note that the moving position and flying position of each of the drones 10b can also be controlled by the operation control information.

For example, with regard to the flying position, each drone 10b is configured to follow-up fly while maintaining a position against the source of the operation control information (the control device 10 such as the person 10a) within a certain radio wave intensity range (for example, a position of 5 m from the control device 10). As a result, the drone flies in formation following the move of the artist or a predetermined drone.

(Control Device 10 Attached to Drone 10b)

The drone 10b according to the present example has the functions of the control device 10 in addition to the controlled device 20. That is, the drone 10b has the functions of both the control device 10 and the controlled device 20, and therefore, the small and lightweight control device 10 and controlled device 20 are attached to the drone 10b.

The drone 10b as the control device 10 flies over the audiences in the concert venue. When the control device 10 is attached to the drone 10b, the control command from the control device 10 reaches the smapho 20a of each of audiences located within a circle range having a distance radius a (for example, 5 m) centering the drone 10b thereon (FIG. 8).

When the smapho 20a receives the control command from the control device 10 of the drone 10b, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command.

For example, when the operation control information is screen light emission, in a dim concert venue, the smapho 20a held by each of the audiences located beneath the drone 10b flying and moving in the venue emits light, and the venue seats are illuminated (a ball of light can be seen at the venue seats). Further, as the drone 10b flies and moves freely in the concert venue, the light emission moves at the venue seats, such that it seems to continue to be illuminated by the spotlight.

In the large concert venue, since the drone 10b can fly and move in the air within the concert venue, the operation staging can be generated everywhere in the venue.

Here, as described above, the person 10a such as an artist or the like can operate and change the control command by using the above smart watch type control device 10 (FIG. 5). Further, the person 10a wearing the smart watch type control device 10 performs a predetermined action such as largely swinging arms, turning arms, clapping, taking a predetermined step and a combination of a plurality of predetermined actions, thereby to transmit the control command of operation corresponding to the predetermined action.

Specifically, when the "device specifying button" for specifying the drone 10b and the "operation button" for specifying vibration are pressed in the control device 10 of the person 10a, it is configured to transmit the control command including the device ID and the operation control information respectively corresponding to the buttons. Here, it is assumed that the device IDs of the drone 10b1, the drone 10b2, the drone 10b3 and the drone 10b4 are respectively Drone 1, Drone 2, Drone 3 and Drone 4.

For example, in the control device 10 of the person 10a, when the control command is changed so as to specify the drone 10b2 and change the content of the operation control information of the own device to "red light emission", the control command including the device ID (Drone 2) and the operation control information (change of the operation control information to "red light emission") is transmitted. This makes the drone 10b2 change operation control information which the drone 10b2 transmits to the controlled device 20 when the drone 10b2 functions as the control device 10.

Similarly to the above, for example, in the control device 10 of the person 10a, when the control command is changed so as to specify the drone 10b4 and change the content of the operation control information of the own device to "blue light emission", the control command including the device ID (Drone 4) and the operation control information (change of the operation control information to "blue light emission") is transmitted. This makes the drone 10b4 change operation control information which the drone 10b4 transmits to the controlled device 20 when the drone 10b4 functions as the control device 10.

The drone 10b2 and the drone 10b4 fly so as to be positioned within the range a where the radio waves reach via the person 10a and the others drone 10b1 and the drone 10b2 (FIG. 8). For this reason, the drone 10b2 and the drone 10b4 as the controlled devices 20 receive the changed control command from the control device 10 of the person 10a. When each of the drone 10b2 and the drone 10b4 receives the control command from the control device 10, each determines whether or not the device ID included in the control command matches the device ID (Drone 2, Drone 4, respectively) of the own device. When they match each other, each accepts the control command to execute operation according to the operation control information included in the control command.

That is, in the operation control information which the drone 10b2 transmits to the smapho 20a when the drone 10b2 functions as the control device 10, the drone 10b2 changes the emission color of the smapho screen to red. After the change, the control command is transmitted from the drone 10b2 to the smapho 20a of each of audiences located within the circle range of the radius a (for example, 5 m) centering the drone 10b2 thereon. For this reason, the red light is emitted from the smapho 20a which positions in the radius a area centering the drone 10b2 thereon.

Similarly to the above, in the operation control information which the drone 10b4 transmits to the smapho 20a when the drone 10b4 functions as the control device 10, the drone 10b4 changes the emission color of the smapho screen to red. After the change, the control command is transmitted from the drone 10b4 to the smapho 20a of each of audiences located within the circle range of the radius a (for example, 5 m) centering the drone 10b4 thereon. For this reason, the blue light is emitted from the smapho 20a which positions in the radius a area centering the drone 10b4 thereon.

In this way, the person 10a such as an artist can freely control the operation of any smapho 20a in the large concert venue via the all drones 10b with arbitrary intention and timing to realize the free staging.

For example, furthermore, when in the control device 10 of the person 10a, the control command is changed so as to specify the drone 10b1, the drone 10b2, the drone 10b3 and the drone 10b4 and change contents of operation control information of own devices to "turning off the light (nonlight emission)", the control command including the device IDs (Drone 1, Drone 2, Drone 3 and Drone 4) and the operation control information (change of the operation control information to "turning off the light") is transmitted.

Simultaneously, when in the control device 10 of the person 10a, the control command is changed so as to specify the drone 10b5 and change a content of operation control information of own device to "light emission", the control command including the device ID (Drone 5) and the operation control information (change of the operation control information to "light emission") is transmitted.

Each of the drone 10b1, the drone 10b2, the drone 10b3, the drone 10b4 and the drone 10b5 flies so as to be positioned within the range a where the radio waves reach through each other (FIG. 8). For this reason, each drone as the controlled device 20 receives the changed control command from the control device 10 of the person 10a Among these, when each of the drone 10b1, the drone 10b2, the drone 10b3 and the drone 10b4 receives the control command from the control device 10, each accepts the control command in the case where the device ID (Drone 1, Drone 2, Drone 3 or Drone 4) included in the control command matches the device ID (Drone 1, Drone 2, Drone 3 or Drone 4) included in the own device. On the other hand, in the case where the device ID (Drone 5) included in the control command does not match the device ID (Drone 1, Drone 2, Drone 3 or Drone 4) of the own device, the control command is discarded.

That is, in the operation control information which each of the drone 10b1, the drone 10b2, the drone 10b3 and the drone 10b4 transmits to the smapho 20a when each drone functions as the control device 10, each of the drone 10b1, the drone 10b2, the drone 10b3 and the drone 10b4 changes operation of the smapho screen to "turning off the light". After the change, the control command is transmitted from each of the drone 10b1, the drone 10b2, the drone 10b3 and the drone 10b4 to the smapho 20a of each of audiences located within the circle range of the radius a centering each drone thereon. For this reason, the light is turned off from the smapho 20a which positions in the radius a area centering each of the drone 10b1, the drone 10b2, the drone 10b3 and the drone 10b thereon.

In contrast, when the drone 10b5 receives the control command from the control device 10, the drone 10b5 discards the control command in the case where the device ID (Drone 1, Drone 2, Drone 3 or Drone 4) included in the control command does not match the device ID (Drone 5) of the own device. On the other hand, in the case where the device ID (Drone 5) included in the control command matches the device ID (Drone 5) of the own device, the control command is accepted.

That is, in the operation control information which the drone 10b5 transmits to the smapho 20a when the drone 10b5 functions as the control device 10, the drone 10b5 changes operation of the smapho screen to "light emission". After the change, the control command is transmitted from the drone 10b5 to the smapho 20a of each of audiences located within the circle range of the radius a centering the drone 10b5 thereon. For this reason, the light is emitted from the smapho 20a which positions only in the radius a area centering the drone 10b5 thereon.

In this manner, each drone 10b flies so as to be positioned within the range a where the radio waves reach through each other, and each drone 10b processes the control command based on determining whether or not the device ID included in the control command matches the device ID of the own device. For this reason, the artist or the like can remotely control any drone 10b.

(Operation Areas Around Beneath Drones 10b)

Figure 9A:
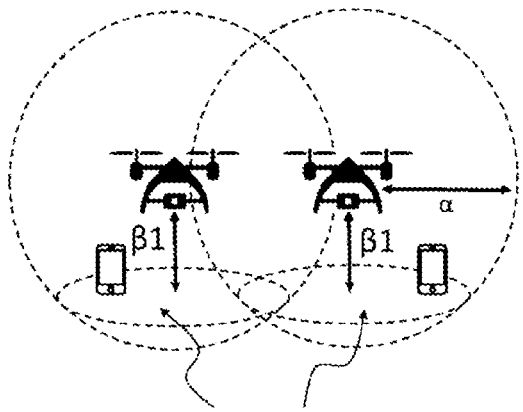
FIGS. 9A-9C are diagram for explaining operation areas (No. 1) around beneath drones 10b according to the present example.
Figure 9B:
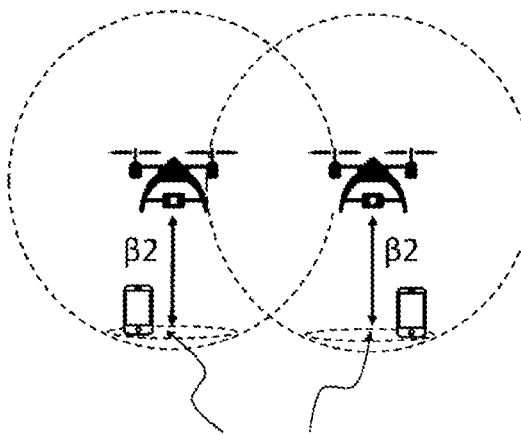
Figure 9C:
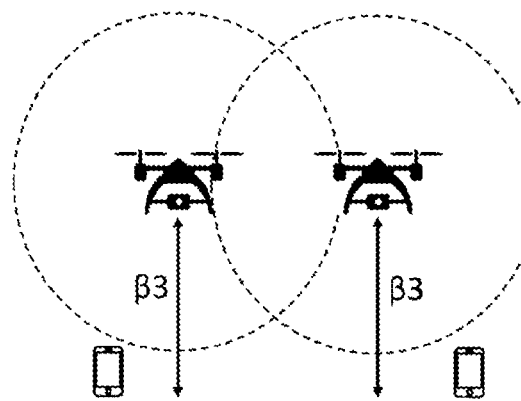

FIGS. 9A-9C are diagram for explaining operation areas (No. 1) around beneath drones 10b according to the present example. In the case of FIG. 8, since the smapho 20a located within the circle range of the radius a operates, the screen emission of the smapho 20a is of, for example, the circle range (dotted circle in the figure) formed by the person 10a and the drones 10b1 to 10b4.

Here, depending on the staging, it may not be desired to connect the circle ranges as shown in FIG. 8. In such a case, the flight altitude of each of the drones 10b can be changed (adjusted). For example, when the flight altitude of the drone 10b is β1, the screen light emission area of each smapho 20a is shown in FIG. 9A. Note that to change the flight altitude can be controlled by the operation control information.

On the other hand, when the flight altitude of the drone 10b is β2, the screen light emission area of each smapho 20a is shown in FIG. 9B. When the flight altitude is β2 (α>β2>β1), the ground area to which the radio waves from the control device 10 reach decreases. Further, when the flight altitude is changed so as to be higher, the screen light emission area becomes a single circle range in which the circle ranges are not connected each other. As a result, it is possible to express a light emission staging different from that in FIG. 9A.

On the other hand, when the flight altitude of the drone 10b is β3, the screen light emission area of each smapho 20a is shown in FIG. 9C. When the flight altitude is β3 (β3>α), it is possible to stop the staging in response to changing the flight altitude to β3 at which the ground area where the radio waves from the control device 10 reach is eliminated.

Conversely, the flight altitude of the drone 10b can be changed (adjusted) so as to decrease from β3 to β2 or β1. As a result, it is possible to produce the staging such that small luminescent circles emitted from dark venue audience seats suddenly appear in the audience seats of the venue, and then the small emitted luminescent circles gradually increase to be eventually connected each other.

Although it is possible to change (adjust) α instead of changing the flight altitude or in combination thereof, the value needs to be adjusted appropriately. This is because the distance between the person 10a and each of the targeted drones 10b1 to 4 needs to be within α in order for the control command from the control device 10 to reach the controlled device 20. In this connection, α cannot be made too small, and if α is made too large, for example, the screen light emission area of the smapho 20a becomes too large.

Figure 10:
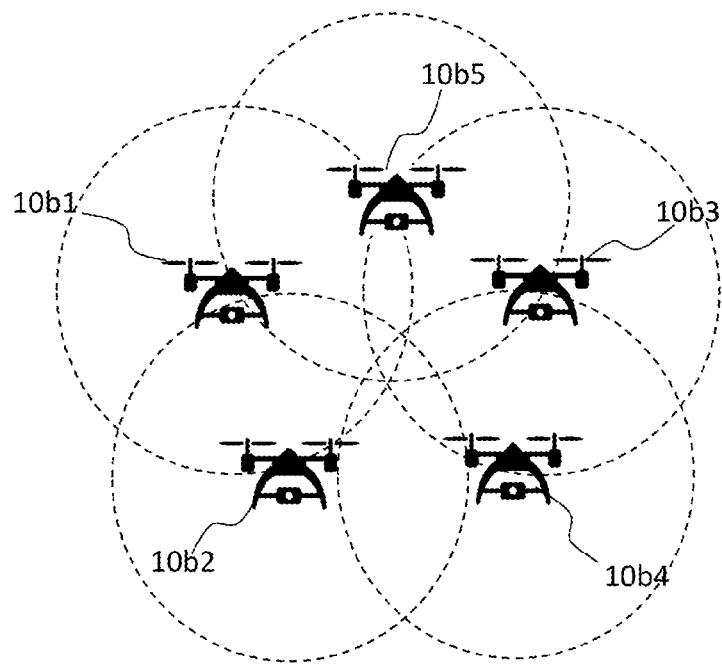
FIG. 10 is a diagram for explaining operation areas (No. 2) around beneath drones 10b according to the present example.

FIG. 10 is a diagram for explaining operation areas (No. 2) around beneath the drones 10b according to the present example. In the above described embodiment, the light emission shape formed by being illuminated by the smartphones 20a is basically a circular shape. This is because the light is emitted from each of the smartphones 20a located within the circle range with the radius a centering the moving body (control device 20) thereon.

However, the light emission shape that can be realized is not necessarily limited to the circular shape. As shown in FIG. 10, it is possible to realize a light emission shape like petals as a whole by adjusting the flight positions of the plurality of the drones 10b so that the circle ranges respectively formed by the drone 10b1, the drone 10b2, the drone 10b3, the drone 10b4 and the drone 10b5 are combined each other.

Moreover, the directivity can be given to the radio waves from the control device 10 with reflecting plates or the like installed in the concert venue. As a result, a shape formed by the aggregate of the smartphones 20a can be a shape other than circle.

Third Example

As the third example, an example in which the present invention is applied in, for example, an Olympic opening ceremony or closing ceremony venue will be described.

Figure 11:
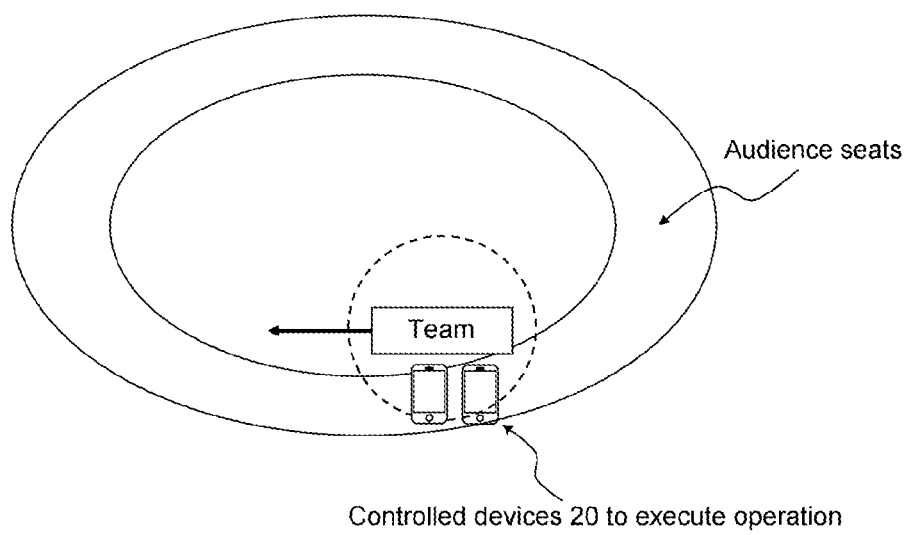
FIG. 11 is a diagram showing a configuration example of the event staging system for an Olympic opening ceremony venue according to the present example.

FIG. 11 is a diagram showing a configuration example of the event staging system in an Olympic opening venue according to the present example. In FIG. 11, an audience of each of audience seats has smapho 20a as the controlled device 20. Further, the control device 10 is attached to, as the "moving body", a placard held by a first person of a team who marches in the venue for example. The team marches (moves) in front of the audience seats.

When the control device 10 is attached to a person 10a such as a team, the control command from the control device 10 reaches the smapho 20a of each of audiences located within a circle range having a distance radius a (for example, 10 m) centering the person 10a thereon.

When the smapho 20a receives the control command from the control device 10, the smapho 20a determines whether or not the device ID included in the control command matches the device ID (for example, Smartphone) of the own device. When they match each other, the smapho 20a accepts the control command to execute operation according to the operation control information included in the control command.

For example, when the operation control information is character/image display, the control device 10 controls the control command to display various characters and images on the screen of the smapho 20a during the concert. Examples of the display character include a message from a team and an introduction of a country, and examples of the display image include a national flag and a face image of a representative player. Further, it is preferable to display the display character in the language of the owner of the smapho 20a by obtaining a country code and a language code from OS of the smapho 20a.

Fourth Example

In connection with the first and second examples described above, an example (No. 3) in which the present invention is applied to, for example, a concert venue will be described as the fourth example.

Figure 12:
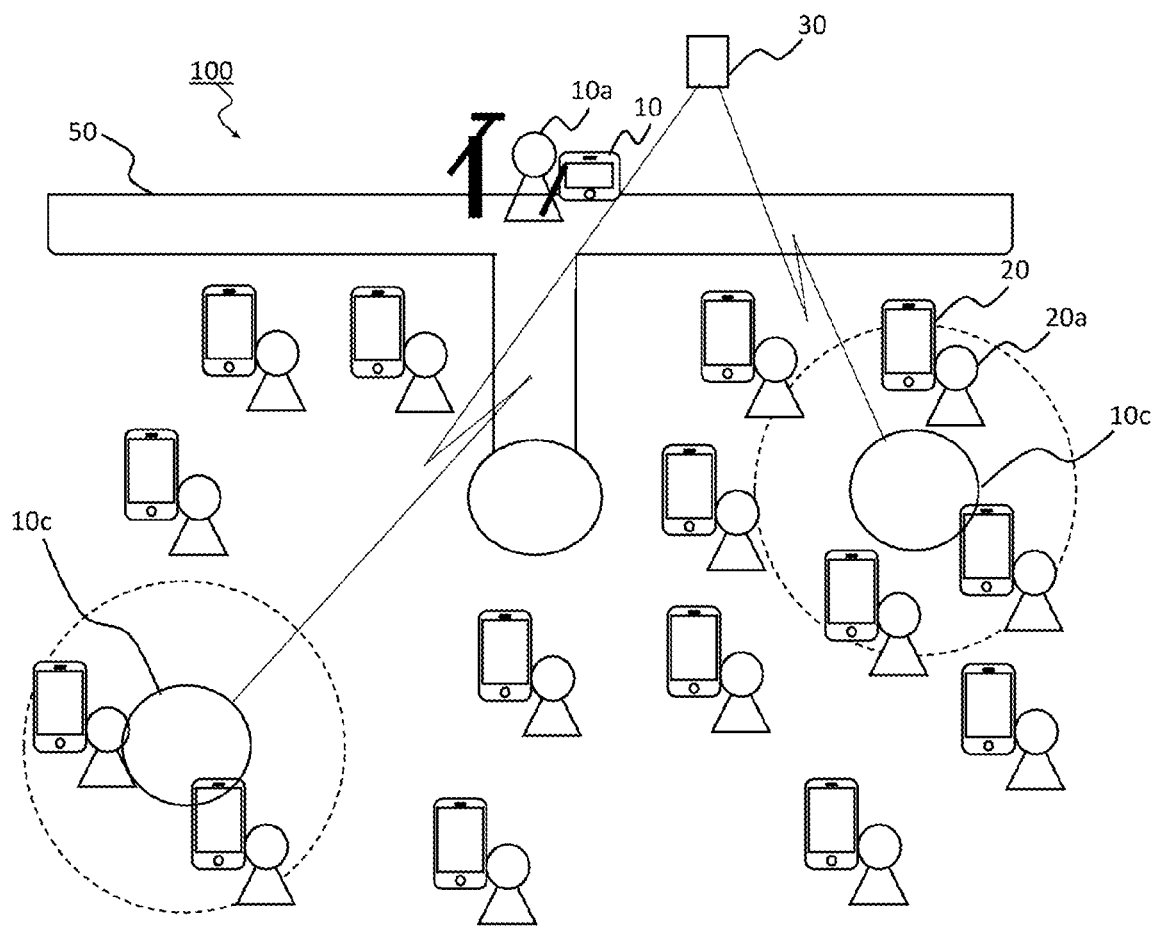
FIG. 12 is a diagram showing a configuration example of the event staging system in a concert venue according to the present example.

FIG. 12 is a diagram showing a configuration example of the event staging system in a concert venue according to the present example. In FIG. 12, a person 10a such as an artist having the control device 10 and audiences 20a each having the smapho 20a as the controlled device 20 are shown. Further, a balloon 10c to which the control device 10 and the controlled device 20 are attached is shown as the "moving body". Further, a relay server 30 provided on or near the concert stage 50 is shown.

In the case of the second example, the drones 10b fly and move in the air within the concert venue, so that the operation staging by the smartphones 20a is generated everywhere in the venue. As a result, the person 10a such as an artist can freely control the operation of any smapho 20a in the large concert venue via the all drones 10b with arbitrary intention and timing to realize the free staging.

Here, depending on the environment of the concert venue, for example, in the case of bad weather such as rain or strong wind in the outdoor venue, or in the case where there is a problem of restrictions with respect to the flight space in the indoor venue, the drone 10b cannot fly and move in the air within the concert venue. In such a case, even if the person 10a such as an artist hopes to operate the smapho 20a of each of the audiences, the person 10a can make only the smapho 20a around the person 10a such as an artist be operated as in the first example (for example, FIG. 1), because the drone 10b cannot fly and move in the air within the concert venue.

Therefore, in the fourth example, the control command from the control device 10 attached to the person 10a such as an artist is made to reach the balloon 10c as the controlled device 200 by interposing the relay server 30. The relay server 30 is a wireless relay device such as an access point, for example. The relay server 30 can output a radio wave having a radio wave intensity by which the radio wave can reach the entire area of the venue.

As described above, the person 10a such as an artist can operate and change the control command by using the above smart watch type control device 10 (FIG. 5). Further, the person 10a wearing the smart watch type control device 10 performs a predetermined action such as largely swinging arms, turning arms, clapping, taking a predetermined step and a combination of a plurality of predetermined actions, thereby to transmit the control command of operation corresponding to the predetermined action.

For example, when the "device specifying button" for specifying the balloon 10c and the "operation button" for specifying various operation controls are pressed in the control device 10 of the person 10a, the control command including the device ID and the operation control information respectively corresponding to the buttons is transmitted.

When the relay server 30 receives the control command from the control device 10 of the person 10a, the relay server 30 transmits the received control command via the radio wave having the radio wave intensity by which the radio wave can reach the entire area of the venue.

In this regard, the relay server 30 is provided within a circular range having a distance radius a (for example, 5 m) centering the person 10a thereon so that the relay server 30 can receive the control command from the control device 10 of the person 10a. In the case where the person 10a such as an artist moves on the concert stage 50, a plurality of the relay servers 30 may be arranged so as to receive the control command from the control device 10 of the person 10a anywhere on the concert stage 50.

The balloon 10c as the controlled device 20 receives the transmitted control command from the control device 10 of the person 10a via the relay server 30. When the balloon 10c receives the control command from the control device 10, the balloon 10c determines whether or not the device ID included in the control command matches the device ID of the own device. When they match each other, the balloon 10c accepts the control command to execute operation according to the operation control information included in the control command.

And then, the balloon 10c that has received the control command operates as the control device 10 to transmit the control command including the device ID and the operation control information. The control command reaches the smapho 20a of each of audiences located within a circle range having a distance radius a (for example, 1 m) centering the balloon 10c thereon.

When the smapho 20a receives the control command from the balloon 10c as the control device 10, the smapho 20a determines whether or not the device ID included in the control command matches the device ID (for example, Smartphone) of the own device. When they match each other, the smapho 20a accepts the control command to execute operation (for example, screen light emission) according to the operation control information included in the control command.

Information Processing

Figure 13:
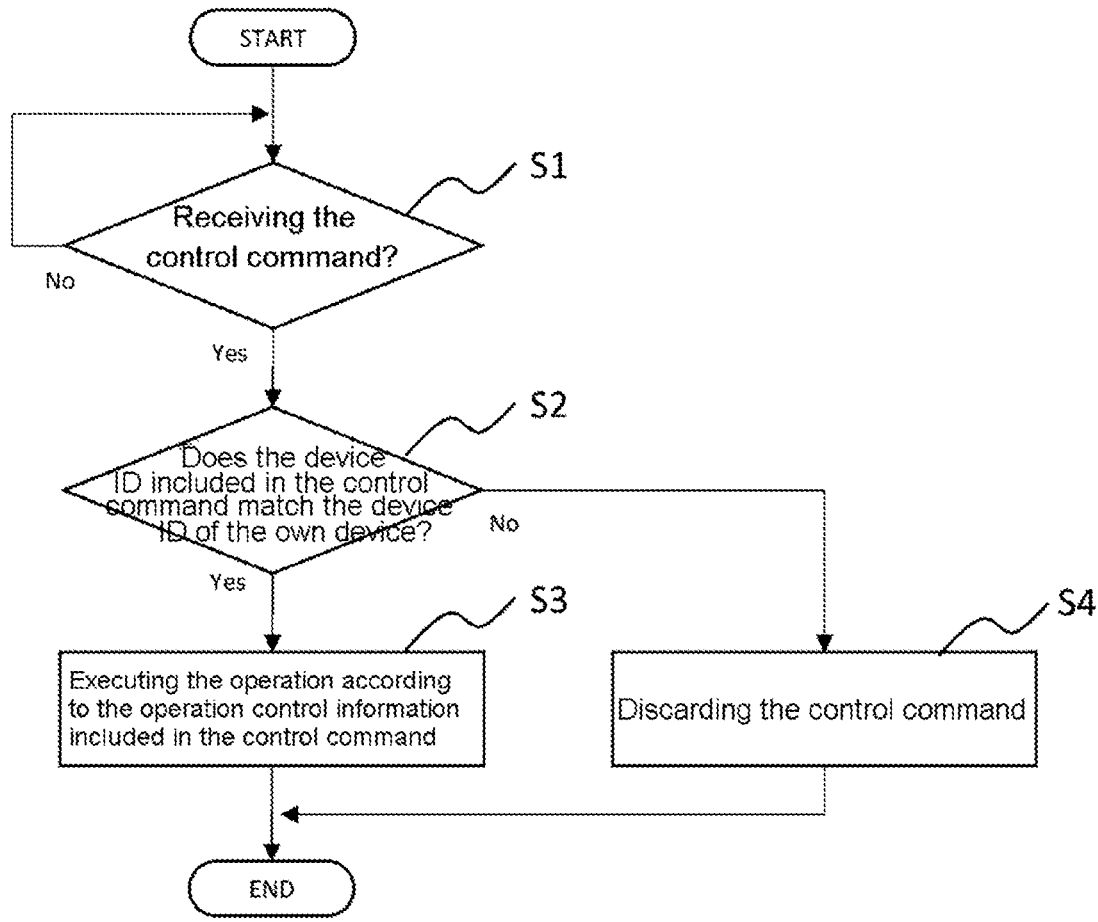
FIG. 13 is a flowchart showing information processing of a controlled device according to the present embodiment.

FIG. 13 is a flowchart showing information processing of a controlled device according to the present embodiment. Information processing of the controlled device 20 according to the present embodiment will be described.

S1: the communication part 201 determines whether or not receiving the control command. The control device 10 have outputted the radio wave having the predetermined intensity. When the controlled device 20 is located within the distance range where the radio wave of the predetermined intensity can reach, the communication part 201 receives the control command.

S2: the operation execution part 202 determines whether or not the device ID included in the control command received in S1 matches the device ID of the own device.

S3: when the both device IDs match each other, the operation execution part 202 executes the operation according to the operation control information included in the control command received in S1.

S4: when the both device IDs, on the other hand, do not match each other, the operation execution part 202 discards the control command received in S1.

SUMMARY

As described above, the radio wave having the predetermined intensity has been outputted from the control device 10 according to the present embodiment. When the distance between the control device 10 and the controlled device 20 is equal to or less than the predetermined distance a, the controlled device 20 receives, via the wireless radio wave, the control command based on the radio wave that has reached from the control device 10. That is, only each controlled device 20 located within the distance range a where the radio wave of the predetermined intensity can reach receives the control command from the control device 10 to execute operation according to the received control command.

For this reason, the control device 10 can control the operation of each of the controlled devices without accurately managing the position of each of the controlled devices 20. Further, it is possible to realize the event staging with higher performance and preference by the structure in which the control device 10 and the controlled device 20 are attached to the moving body. In addition, it is possible to realize various staging covering a vast venue without large facility costs. As described above, the event staging system 100 according to the present embodiment can realize a variety of realistic staging under various venue environments.

It should be noted that although the present invention has been described by way of preferred embodiments of the present invention with specific examples, it is apparent to variously modify and change these specific examples without departing from the broad spirit and scope of the present invention as defined in the claims. In other words, the present invention should not be construed as being limited by the details of the specific examples and the accompanying drawings.

EXPLANATION OF REFERENCE NUMERAL

10 Control device
10a Person
10b Drone
10c Balloon
10d Camera
20 Controlled device
20a Smartphone
30 Relay server
100 Event staging system
101 Control part
102 Communication part
103 Changing part
201 Communication part
202 Operation execution part

What is claimed is:

1. An event staging system comprising a first device attached to a first moving body, a second device, attached to a second moving body and a third device attached to a third moving body,
wherein the first device includes:
a control unit configured to generate a first control command including operation control information for controlling operation of the second device and an identifier of the second device;
a communication unit configured to output a radio wave of a predetermined intensity and wirelessly transmit the first control command within a distance range where the radio wave of the predetermined intensity reaches; and
a changing unit configured to change operation of the second device;
wherein the second device includes:
a communication unit configured to wirelessly receive the first control command;
an operation execution unit configured to execute operation according to the operation control information included in the wirelessly received first control command when an identifier included in the wirelessly received first control command matches an identifier of the second device;
a control unit configured to generate a second control command including operation control information for controlling operation of the third device; and
a communication unit configured to output a radio wave of a predetermined intensity and wirelessly transmit the second control command within a distance range where the radio wave of the predetermined intensity reaches;
wherein the third device includes:
a communication unit configured to wirelessly receive the second control command; and
an operation execution unit configured to execute operation according to the operation control information included in the wirelessly received second control command, and
wherein when the operation of the second device is changed by the changing unit,
the control unit of the first device generates the first control command including operation control information for changing a content of the operation control information of the second control command to be generated by the control unit of the second device;

the operation execution unit of the second device changes the content of the operation control information of the second control command to be generated by the control unit of the second device according to the operation control information of the first control command; and the control unit of the second device generates the second control command containing the operation control information having the changed content.

2. The event staging system as claimed in claim 1, wherein the control unit of the second device generates the second control command further including an identifier of the third device; and when an identifier included in the wirelessly received second control command matches an identifier of the third device, the operation execution unit of the third device executes operation according to the operation control information included in the wirelessly received second control command.

3. The event staging system as claimed in claim 1, wherein the event staging system is for a concert venue and the operation execution unit of the third device executes operation related to at least any one of staging including a light emission of a screen or light, a change of a light emission color, a character and image display, a vibration generation or a sound output.

4. The event staging system as claimed in claim 1, wherein the event staging system is for a concert venue, wherein the first device is attached to an artist as the first moving body;

the second device is attached to a balloon as the second moving body thrown into audience seats;

the third device is a smartphone attached to an audience as the third moving body; and the operation execution unit of the smartphone executes operation related to at least any one of staging including a light emission of a screen or light, a change of a light emission color, a character and image display, a vibration generation or a sound output.

5. The event staging system as claimed in claim 1, wherein the event staging system is for a concert venue, wherein the first device is attached to an artist as the first moving body;

the second device is attached to a flying object as the second moving body flying over an audience;

the third device is a smartphone attached to the audience as the third moving body;

the operation execution unit of the smartphone executes operation related to at least any one of staging including a light emission of a screen or light, a change of a light emission color, a character and image display, a vibration generation or a sound output.

6. A non-transitory computer readable medium comprising a computer program containing instructions, that causes a first device comprising a first CPU, a first memory, a first display unit, a first input unit, a gyro sensor and a first communication unit attached to a first moving body to perform operations of:

generating a first control command including operation control information for controlling operation of a second device and an identifier of the second device, the second device comprising a second CPU, a second memory, a second display unit, a second input unit and a second communication unit;

outputting a radio wave of a predetermined intensity and wirelessly transmitting the first control command within a distance range where the radio wave of the predetermined intensity reaches; and changing operation of the second device;

that causes the second device attached to a second moving body to perform operations of:

wirelessly receiving the first control command;

executing operation according to the operation control information included in the wirelessly received first control command when an identifier included in the wirelessly received first control command matches an identifier of the second device;

generating a second control command including operation control information for controlling operation of a third device comprising a third CPU, a third memory, a third display unit, a third input unit and a third communication unit; and outputting a radio wave of a predetermined intensity and wirelessly transmitting the second control command within a distance range where the radio wave of the predetermined intensity reaches, that causes the third device attached to a third moving body to perform operations of:

wirelessly receiving the second control command; and executing operation according to the operation control information included in the wirelessly received second control command; and that, when the operation of the second device is changed, causes the first device to perform an operation of:

generating the first control command including operation control information for changing a content of the operation control information of the second control command to be generated by the second device; and that causes the second device to perform operations of:

changing the content of the operation control information of the second control command to be generated by the second device according to the operation control information of the first control command; and generating the second control command containing the operation control information having the changed content.

7. A non-transitory computer readable medium comprising a computer program containing instructions as claimed in claim 6, further causing the second device to perform an operation of generating the second control command further including an identifier of the third device; and causing the third device, when an identifier included in the wirelessly received second control command matches an identifier of the third device, to perform an operation of executing operation according to the operation control information included in the wirelessly received second control command.

8. A non-transitory computer readable medium comprising a computer program containing instructions as claimed in claim 6, further causing the third device to perform an operation of executing operation related to at least any one of staging including a light emission of a screen or light, a change of a light emission color, a character and image display, a vibration generation or a sound output.

* * * * *